Inventor
RICHARD H. LONG
By H.O. Clayton
Attorney

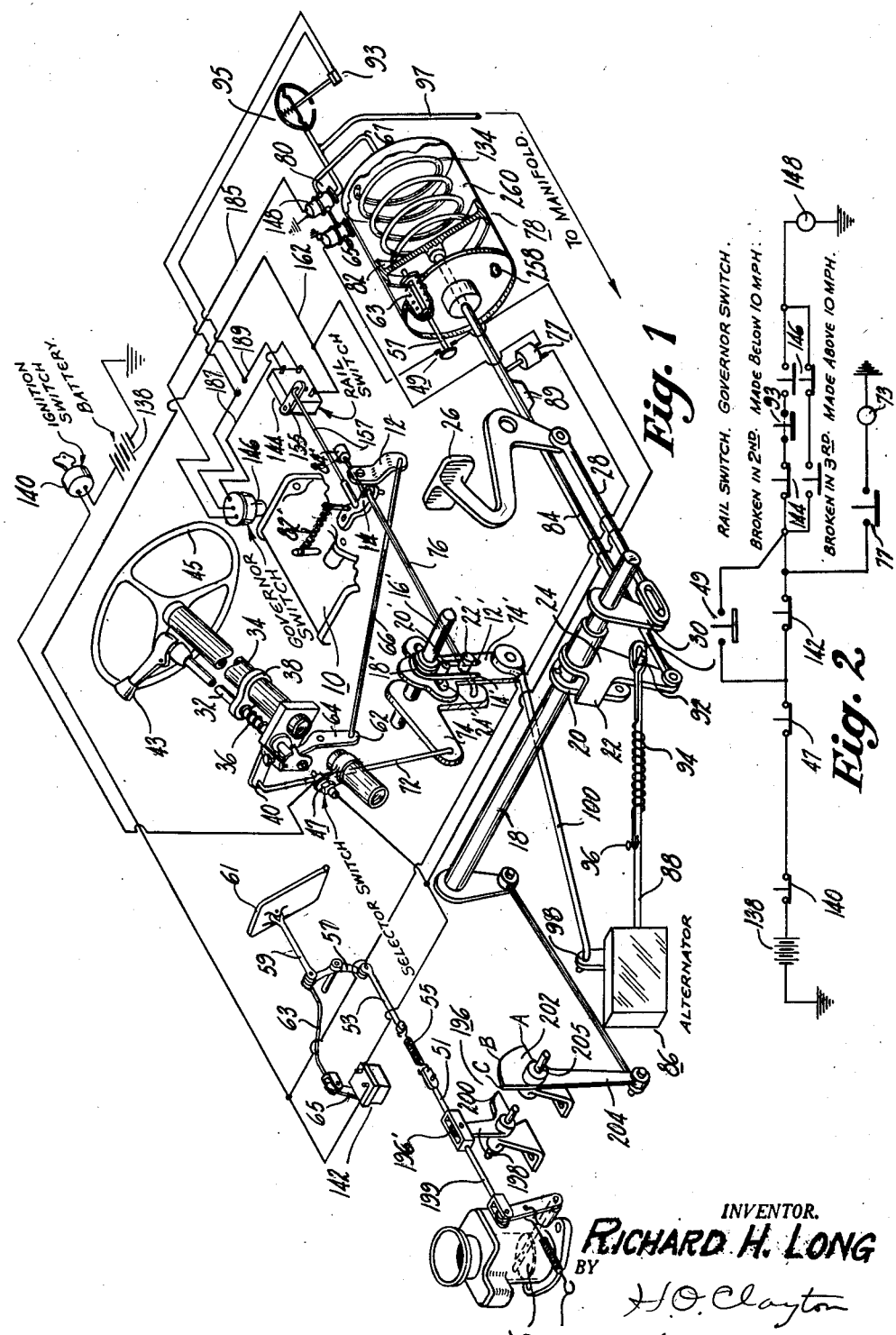

March 10, 1953   R. H. LONG   2,630,894
TRANSMISSION OPERATING MECHANISM
Filed May 14, 1947   8 Sheets-Sheet 3

Inventor
RICHARD H. LONG
By H. O. Clayton
Attorney

March 10, 1953     R. H. LONG     2,630,894

TRANSMISSION OPERATING MECHANISM

Filed May 14, 1947     8 Sheets-Sheet 5

INVENTOR.
RICHARD H. LONG
BY
H. O. Clayton
ATTORNEY.

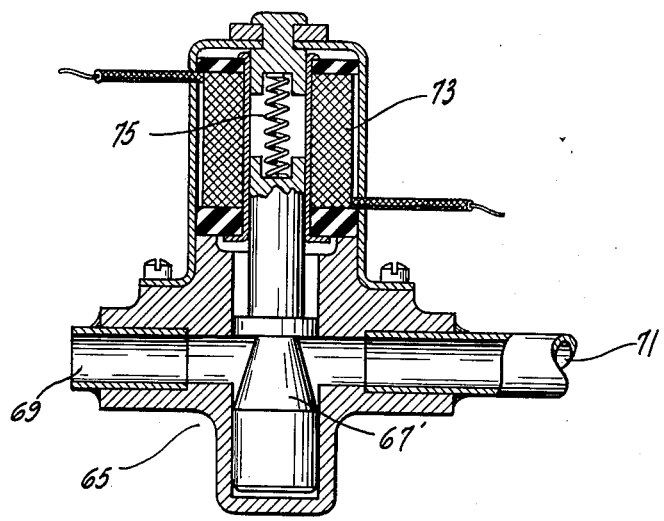
Fig. 14
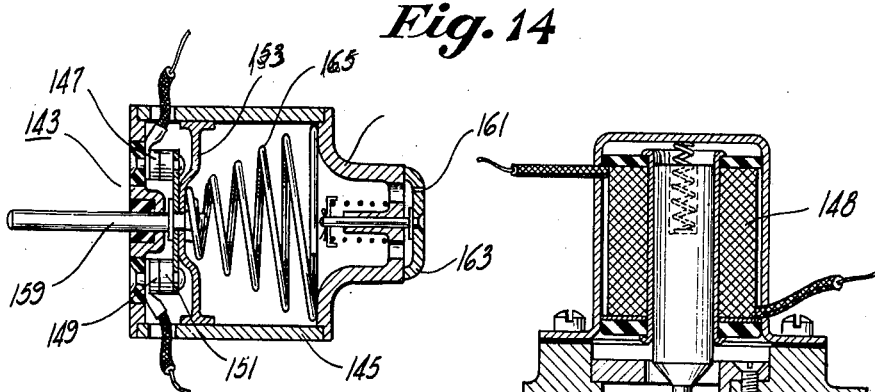
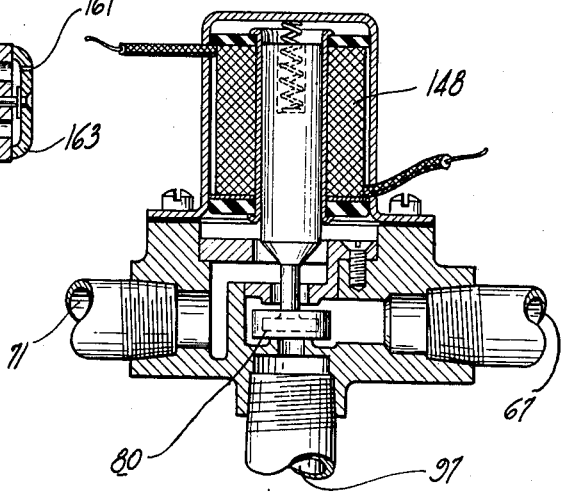
Fig. 16
Fig. 15
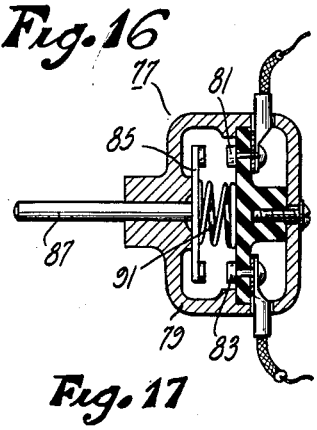
Fig. 17
INVENTOR
RICHARD H. LONG
BY H.O. Clayton
ATTORNEY.

Patented Mar. 10, 1953

2,630,894

UNITED STATES PATENT OFFICE 2,630,894

TRANSMISSION OPERATING MECHANISM

Richard H. Long, South Bend, Ind., assignor to Bendix Aviation Corporation, South Bend, Ind., a corporation of Delaware Application May 14, 1947, Serial No. 748,053

15 Claims. (Cl. 192—.073)

This invention relates in general to the power transmission mechanism of an automotive vehicle and in particular to means for operating the change-speed transmission of said mechanism.

One of the objects of the invention is to provide, in an automotive vehicle including a fluid coupling and a three speeds forward and reverse transmission, a simple mechanism, power operated in part, for operating said transmission, all of the settings thereof being effected by a manual operation of said mechanism if the driver desires to so operate the mechanism, and the second and high gear settings of the transmission and the operation of the friction clutch and the throttle to facilitate said settings, being effected by power means if the driver elects this operation of the mechanism.

A further object of the invention is to provide in an automotive vehicle including a fluid coupling, a gear shift lever, a friction clutch and a three speeds forward and reverse transmission, means for operating and for facilitating the operation of said transmission including power means, comprising a single acting motor, which is automatically operable, after the gear shift lever is placed in a certain position and the accelerator is released, to establish the transmission either in its second gear setting or its high gear setting, depending upon the speed of the vehicle, the friction clutch being operated by said motor to facilitate this operation of the transmission, said first-mentioned means further including manually operated means for effecting any one of the gear settings of the transmission.

An important object of the invention is to provide a power plant for an automotive vehicle, the control of which requires but a minimum of physical and mental effort on the part of the driver; and to this end it is an object of the invention to provide, in a power plant including a friction clutch of standard design, a fluid coupling of standard design, a change gear transmission and an internal combustion engine having a throttle valve, manually and power operated mechanism for operating the throttle valve, clutch and the transmission, the controls for said mechanism being limited to the accelerator, a vehicle speed responsive governor, the clutch pedal, and the shift lever, the accelerator of said four controls receiving the greater use.

A further object of my invention is to provide power and manually operated means for operating the three speeds forward and reverse transmission of an automotive vehicle and for operating the clutch and throttle to facilitate the operation of the transmission, said means being manually operated by an operation of the gear shift lever of the vehicle, to establish the transmission in any one of its several settings, and being power operated, by a movement of the gear shift lever to two different positions, to either establish the transmission in its second gear setting or make possible an operation of the power means to establish the transmission in either its second gear setting or its high gear setting.

Yet another object of the invention is to provide power and manually operated mechanism for operating a three-speeds forward and reverse transmission, the power means of said mechanism being operative to alternately effect the second and high gear settings of the transmission and the manually operated means of said mechanism being selectively operative to establish the transmission in any one of its four settings.

The most important object of my invention is to provide power means, operative in a cycle of operations and controlled in part by an operation of the accelerator and a vehicle speed responsive governor, for alternately effecting first one and then the other of two settings of the change speed transmission of an automotive vehicle and for operating the clutch and the throttle of the vehicle to facilitate the operation of the transmission, said power means being so operative that the throttle is held closed as the clutch is being disengaged; and another object of my invention is to so construct said power means that the operations of the transmission called for by the governor is completed and despite either a depression of the accelerator during the vacuum operation of the motor of the power means or a slowing down of the speed of the vehicle below governor speed as the mechanism is operating to establish the transmission in the higher of the two aforementioned settings; and yet another object of my invention is to so construct the aforementioned mechanism that the driver may, at will, overrule the automatic operation of the mechanism when the transmission is established in the higher of the two aforementioned settings, said overrule operation serving by the operation of the power means to establish the transmission in the lower of the two settings of the transmission.

Other objects of the invention including the provision of a certain yieldable connection between the transmission and power means, and the provision of means operative at relatively high vehicle speeds for preventing an operation of the transmission from high to second gear, will appear more fully hereinafter from the following detailed description when taken in connection with the accompanying drawings wherein a single embodiment of the invention is illustrated.

Figure 1 is a diagrammatic view of one embodiment of my invention disclosing the principal features thereof;

Figure 2 is a wiring diagram of the electrical mechanism disclosed in Figure 1;

Figure 14 is a sectional view disclosing details of the solenoid operated choke valve of the clutch control mechanism disclosed in Figure 1;

Figure 15 is a sectional view disclosing details of the solenoid operated three way valve of the clutch control mechanism disclosed in Figure 1;

Figure 16 is a sectional view disclosing details of the transmission operated switch 143 constituting part of the controls of the electrical mechanism disclosed in Figure 19.

Figure 17 is a sectional view disclosing details of the motor operated clutch control switch 77 disclosed in Figure 1;

Figure 19:
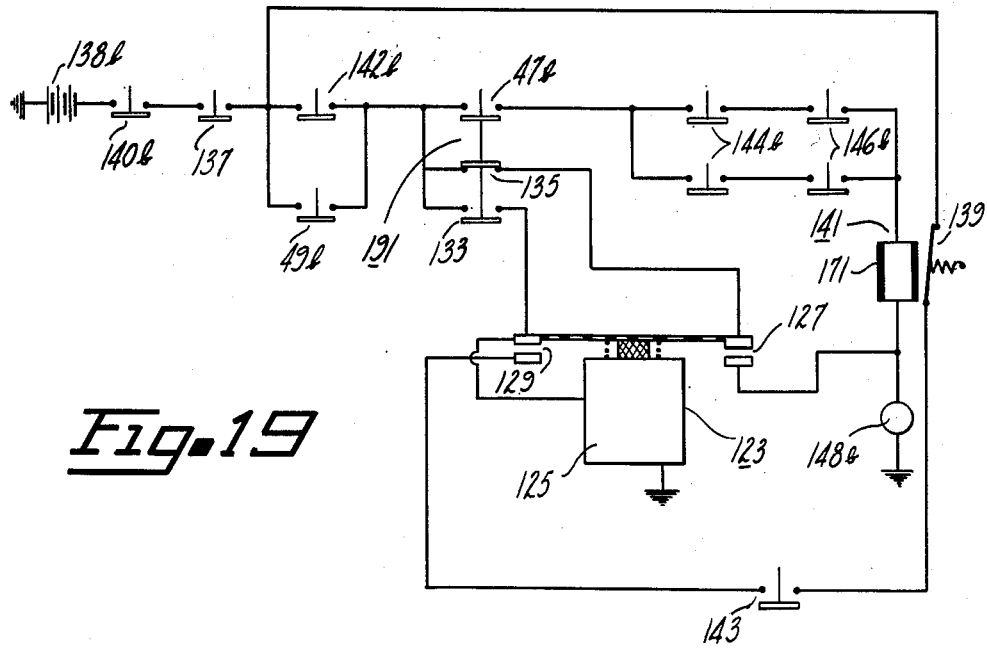
Figure 20:
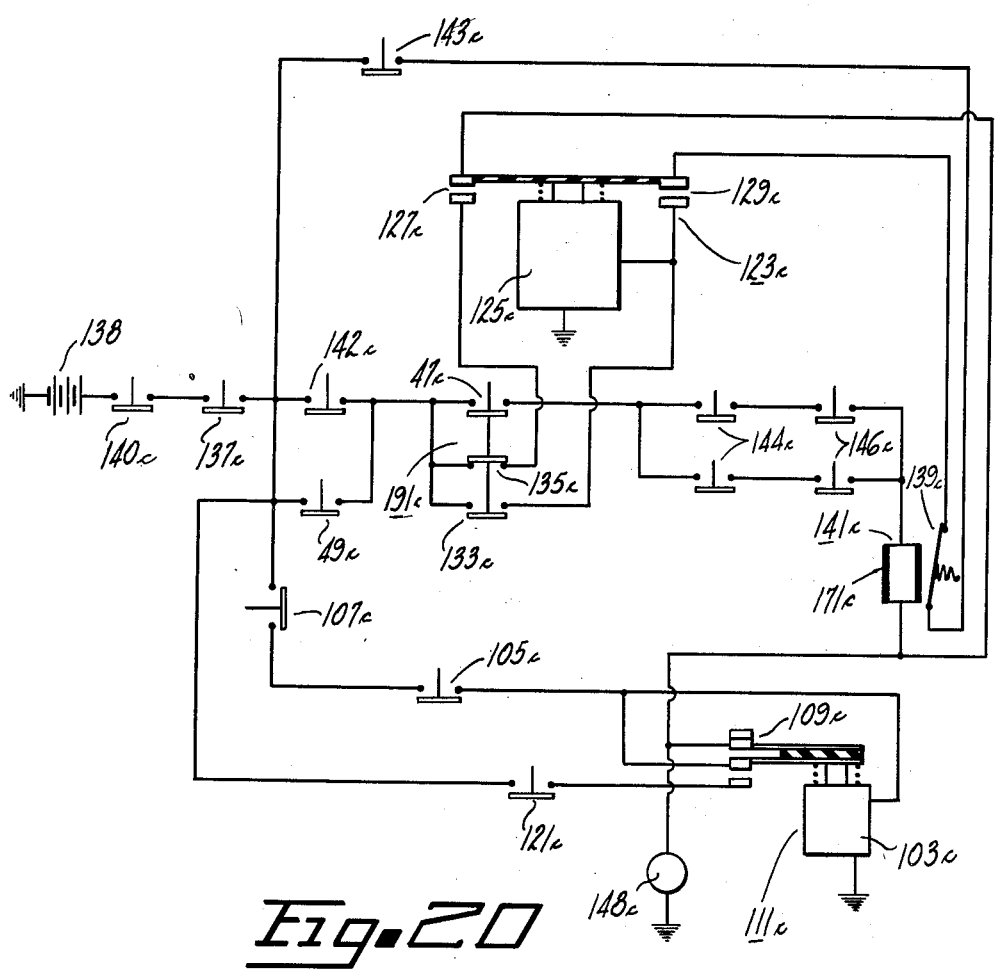

Figure 19 discloses the electrical control means of another embodiment of my invention; and Figure 20 discloses the electrical control means of yet another embodiment of my invention.

Referring now to Figure 1 disclosing a preferred embodiment of the invention, a three-speeds forward and reverse transmission 10 is operated by means of a manually operated crank 12 and a manually and power operated crank 14, the crank 12 serving to operate the shift rail selecting mechanism of the transmission and the crank 14 serving to operate that part of the transmission functioning to move the selected rail to establish the transmission in the desired gear ratio. With such a transmission the crank 14 must be moved to its transmission neutral position to neutralize the transmission before the shift rail selecting crank 12 may be operated.

The invention has to do with the manually and power operated means for actuating the aforementioned transmission operating cranks 12 and 14; for operating the engine throttle 16, and for operating a conventional friction clutch, not shown, said clutch including the usual driving and driven plates forced into engagement by clutch springs. The aforementioned transmission and the clutch as well as the hereinafter referred to fluid coupling are of conventional design, accordingly, no claim is made thereto and the same are not disclosed in the drawings.

Therefore the mechanism of my invention preferably includes the combination of a fluid coupling, such e. g. as that which was incorporated in several 1941 and 1942 passenger vehicles, with the aforementioned mechanism which operates the transmission, throttle and friction clutch; and said coupling, which is preferably incorporated in the power plant between the engine and the friction clutch, includes an impeller and a vaned rotor, the latter serving to drive the aforementioned driving plate of the clutch.

The friction clutch is operably connected to a clutch throw out shaft 18 to which is keyed a crank member 20 contactable by a flange member 22 extending laterally from a crank member 24 rotatably mounted on the shaft 18. The conventional manually operated clutch pedal 26 of the car is operably connected, by a link 28, to a crank 30 which is drivably connected to the shaft 18. As is disclosed in Figure 1 the connection between the crank 30 and link 28 is of the lost motion type to obviate a movement of the clutch pedal when the clutch is power operated by the mechanism described hereinafter.

Describing now an important feature of the invention, the same lies in the manually and power operated mechanism for operating the clutch operating shaft 18, the transmission operating cranks 12 and 14 and the throttle operating mechanism, all of said mechanism being disclosed in Figure 1. The shift rail operating cranks 12 and 14 are actuated by force transmitting means including a rotatable and bodily movable shaft 32 extending alongside the steering column 34 of the vehicle. As is disclosed in Figures 1, 5 and 6, the shaft 32 is biased downwardly by a spring 36 positioned between a stop 38 mounted on the steering column and a crank member 40 which is operably connected to said shaft by means of a clutch mechanism 42 described hereinafter. A shift lever 43 mounted beneath the steering wheel 45 is so connected to the shaft 32 that a rotation of said lever in a plane parallel to said wheel effects a rotation of said shaft about its longitudinal axis in the operation of either neutralizing the transmission or establishing the same in a gear setting; and this connection between the shift lever and shaft 32 is also such that the cross-shift movement of the shift lever, that is, the movement in a plane perpendicular to the plane of the steering column, results in a movement of the shaft 32 to either effect a shift rail selecting operation of the crank 12 or effect a declutching operation of the clutch 42 and a closing of a selector switch 47 to prepare the mechanism for its power operation.

Describing the aforementioned clutch mechanism 42, the said mechanism includes a member 44 sleeved over the lower end of the shaft 32, said member being permanently secured as by brazing to the crank 40. The lower end portion of the member 44 is provided with a flange 46 which is recessed at 48, Figure 5, to provide a keyway for a key portion 50 of a spool-shaped end portion of a clutch member 52, said member being sleeved over and drivably connected by splines 54 to the end portion 56 of the shaft 32. A nut 58, threaded on the end of the shaft portion 56, serves as a stop for the clutch mechanism which is biased downwardly by the operation of the spring 36.

The upper arm 60 of a bell-crank lever 62 fits within the spool shaped portion of the clutch member 52 and the lower arm 64 of said lever is pivotally connected, by a link 66, to the shift rail selecting crank 12. As is disclosed in Figure 6, the spring 36 serves to bias the clutch 42 and shaft 32 as a unit downwardly, the movement being limited by a stop 68 constituting a part of a steering column mounted bracket member 70; and in this position of the clutch 42 the shift rail selector crank 12 is actuated to prepare the transmission for either a second gear or high gear operation, said operation of course depending upon the subsequent actuation of the shift rail operating crank 14. To actuate the crank 12 to prepare the transmission for either a low gear or reverse gear operation, that is, a selection of the low and reverse gear shift rail of the transmission, the driver lifts the shift lever 43 upwardly in a plane perpendicular to the plane of the steering wheel; and this operation serves to rotate the bell crank lever 62 in a counter-clockwise direction, Figure 5, the spring 36 being compressed and the flange 46, Figure 6, being moved into engagement with the stop 68. To actuate the shift rail operating crank 14 to neutralize the transmission or establish the same in any one of its four gear ratio settings, the driver rotates the shift lever 43 in a plane parallel to the plane of the steering wheel thereby effecting an angular movement of the crank 40 which is preferably connected to the crank 14 by force transmitting means including rod 72, a bell crank lever 74 and a rod 76.

There is thus provided, by the above described mechanism, means for manually operating a three-speeds forward and reverse transmission; and in this manual operation of the transmission the shift lever 43 is movable to a plurality of different positions, said selective movement outlining the letter H.

An important feature of the invention lies in the power means for operating the transmission and clutch and one embodiment of said means is diagrammatically disclosed in Figure 1. The principal element of this power means consists of a single-acting fluid pressure motor 78 operably connected to the clutch throwout shaft 18 and to the shift rail operating crank 14; and said motor is controlled by a standard type of solenoid operated three way valve 80, Figure 15, no claim to which is made.

Describing now the details of the aforementioned power means, the power element 82 of the motor 78 is connected to the crank 24 by a link 84; and said crank is preferably yieldingly connected to an alternator 86 by means including a pin 92 extending from the crank 24. One end of a spring 94, preferably coiled around a link 88, is connected to a pin 96 secured to said link; and the other end of said spring is fastened to the pin 92. This spring is, for a purpose to be described hereinafter, preferably weaker than a preloaded torsion spring 18'. A crank 98 of the alternator mechanism 86 is pivotally connected to a crank 74' by a link 100.

The crank 74' is preferably rotatably mounted on a support shaft 16', said shaft also serving as a mounting for the crank 74. The parallel ends 14' and 12' of the preloaded torsion spring 18' serve to bias a pin 20' to a position above a pin 22'. The pin 20' is fixedly secured to the crank 74 and extends laterally therefrom through a slot 24' in the crank 74'; and the pin 22' is fixedly secured to and extends laterally from the latter crank. The preloaded spring 18' is preferably so constructed that the ends 12' and 14' of the same exerts a certain force, say thirty pounds, when the spring and cooperating parts are positioned as disclosed in Figure 1, that is, in the position to align the pins 20' and 22'. Then when the motor 78 is vacuum energized to operate the clutch and transmission, the movement of the piston 82 to its bottomed position in the motor serves to increase the loading of the spring 18' by a certain factor, say fifteen pounds. Preferably, the total transmission remeshing force exerted by the spring, that is the assumed forty-five pounds, is appreciably less than the transmission demeshing and clutch disengaging force exerted by the piston 82 when the accelerator is released to initiate the operation of the motor 78. Incidentally, the degree of transmission meshing movement of the rod 76 is limited by the operation of ends of the members 12' and 14' which serve as stop members in striking the pin 22'. The spring 94 may be omitted in which case the torsion spring 18' is distorted, that is, tensioned as the clutch is being disengaged it being remembered that the force exerted by the piston 82, after the accelerator is released to idle the engine and thereby effect a high vacuum in the intake manifold is materially greater than the force necessary to distort the spring 18', that is, the force ultimately effective to effect the meshing of the gears of the transmission. The principal object in using a preloaded torsion spring is to insure the subjection of the crank 14 to a relatively light gear meshing load after the piston 82 has bottomed in the motor 78; and it is also to be noted that the torsion spring 18' is located in the connection between the motor 78 and the crank 14 at a point in said connection relatively close to said crank, preferably between the alternator 86 and crank. The object in so locating the spring 18' is to minimize the portion of the connection to be moved by the spring 18' after the gears to be meshed have reached synchronous speeds. The latter movement of course effects the new setting of the transmission, the gears moving into mesh with one another after being synchronized. The gear meshing operation of the spring 18' may be supplemented by the load effected by an overcenter spring 82'; and as another feature of my invention the meshing of the gears may be cushioned by the operation of a dash pot 84'. There is thus provided what may be defined as a transmission operating preloaded limited overtravel connection interconnecting the alternator 86 and the transmission; and the operation of this mechanism is described in greater detail hereinafter.

Figure 4:
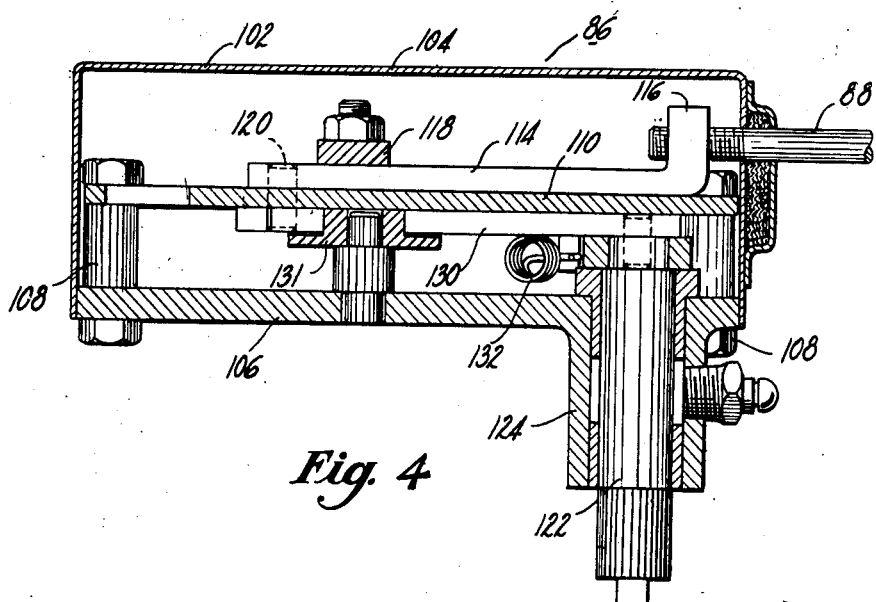
Figure 4 is a sectional view of the alternator unit said view being taken on the line 4—4 of Figure 3.

Describing now the details of the alternator 86, that is the direction changing mechanism of the invention, the same includes a casing 102, Figure 4, of two parts 104 and 106. To the casing part 106 there is detachably secured by bolts 108 a plate 110 having a V-shaped guide slot 112 therein, and a thrust member 114 adjustably secured at 116 to the link 88 and positioned between a strap 118 and the outer face of the plate 110 is provided with a laterally extending pin 120 which extends through the aforementioned V-shaped slot. To the outer end of a rotatable shaft 122 journalled in a boss 124 extending from the casing part 106 there is drivably connected the aforementioned crank 98, Figure 1; and to the inner end of the shaft 122 there is drivably connected a bell crank lever 126. To one end of the latter lever there is pivotally connected a thrust link 128 which is recessed at its outer end to receive the pin 120; and to the other end of the lever 126 there is pivotally connected another thrust link 130 which is also recessed at its outer end to receive the pin 120; and the two thrust links are biased towards each other into contact with a guide roller 131 by a spring 132 connected to both of said links.

Figure 3:
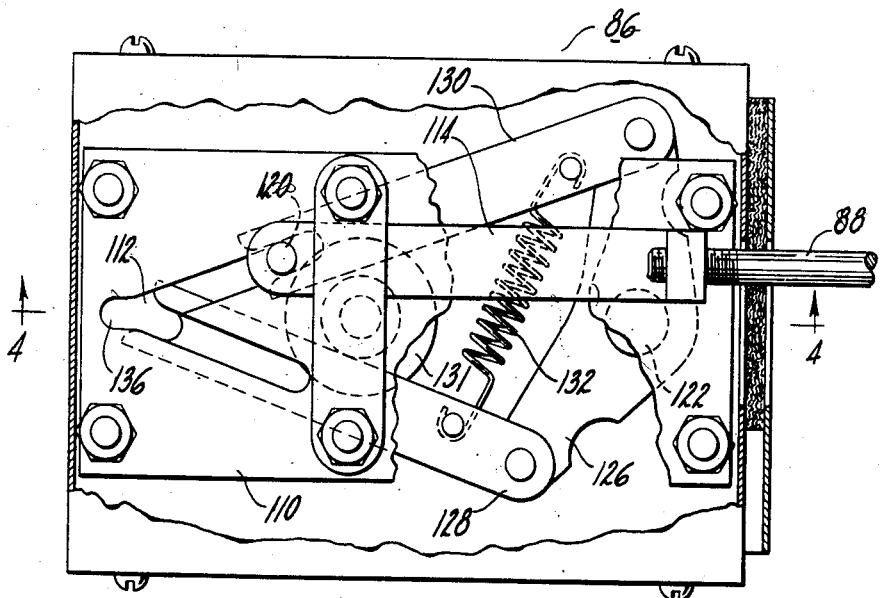
Figure 3 is a view disclosing details of the alternator unit of Figure 1.

Describing the operation of the above described alternator 86, when the fluid pressure motor 78 is deenergized a return spring 134 therein together with the clutch springs, serve to move the link 88 and thrust member 114 connected thereto to the left, Figure 3, to position the pin 120 within a recess 136 constituting the apex of the aforementioned V-shaped guide slot 112; then when the motor 78 is energized to effect an operation of the transmission and clutch the pin 120, after moving a relatively short distance, rests within the recessed end of one or the other of the thrust links 128 and 130, depending upon whether the transmission is at the time established in second gear or in high gear. Continued movement of the thrust member 114 then results in a rotation of the lever 126 to rotate the crank 98 to establish the transmission in its new setting; and as will be noted from an inspection of Figure 3 this operation of the lever 98 serves to move the then inoperative thrust link into position preparatory for its operation to rotate the lever 126.

There is thus provided an alternator or direction changing means whereby the transmission operating angular movement of the crank 14 is alternately reversed with each successive energization of the single-acting motor 78.

Figure 10:
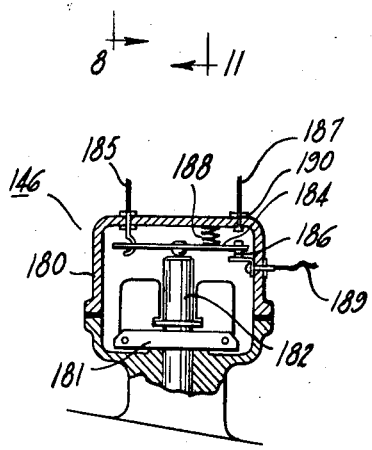
Figure 10 is a sectional view disclosing details of the governor operated switch of the invention.

As to the means for controlling the operation of the motor 78, said means includes the electrical mechanism disclosed in Figures 1 and 2; and this mechanism comprises a grounded battery 138, the ignition switch 140 of the car, the aforementioned shift lever operated selector switch 47, an accelerator operated breaker switch 142 which is closed when the accelerator is released, a shift rail operated double throw switch mechanism 144, including two separate breaker switches, a vehicle speed responsive governor operated single pole double throw switch mechanism 146, Figure 10, and a grounded solenoid 148 which operates the motor controlling three way valve 80. The aforementioned switch mechanisms are electrically interconnected in series as disclosed in Figure 2, and of said mechanisms the accelerator operated switch is of a conventional breaker switch construction; accordingly, the same is not disclosed in detail.

Figure 8:
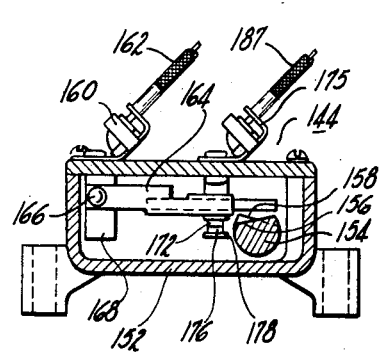
Figure 8 is a sectional view disclosing details of the transmission operating cut out switch of the invention, said view being taken on the line 8—8 of Figure 9.
Figure 9:
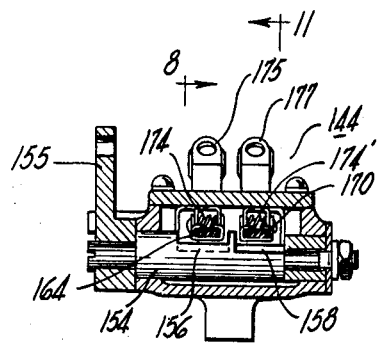
Figure 9 is a sectional view of the transmission operated cut out switch of the invention.
Figure 11:
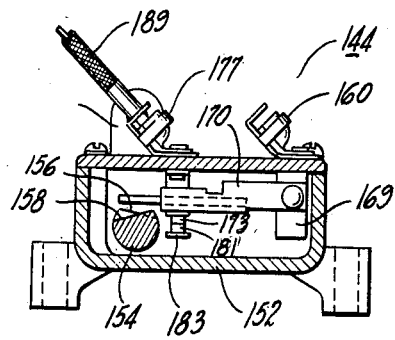
Figure 11 is another sectional view of the switch mechanism of Figure 8 said view being taken on the line 11—11 of Figure 9.
Figure 12:
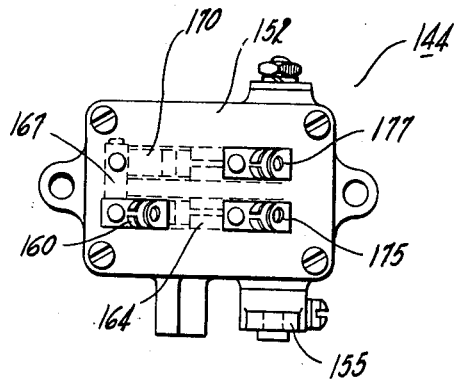
Figure 12 is a plan view disclosing details of the switch mechanism of Figure 8.

As to the rail switch mechanism 144, which is disclosed in Figures 8 and 11, in its transmission neutral position, the same includes a two part casing 152 having journalled therein a switch operating cam shaft 154; and said shaft is provided with an inclined flat 156 and an oppositely inclined flat 158. A crank 155 is secured to the end of the shaft 154 and said crank is connected to the shift rail operating crank 14 by a link 157. A switch terminal 160 receives a hot wire 162, Figure 1, and to this terminal there is electrically connected a movable switch member 164 of electrical conductive material and which is pivotally connected at 166 to a post 168 secured to the inner face of the casing. Another movable switch member 170 electrically connected by a conductor 167, Figure 12, to the terminal 160 and positioned alongside the switch member 164, is pivotally connected to a post 169 extending inwardly from the casing; and to said movable switch members 164 and 170 there are secured switch contacts 172 and 173 respectively. Torsion springs 174 and 174′ serve to bias the switch members 164 and 170 downwardly to move the aforementioned switch contacts 172 and 173 into engagement with fixed switch contacts 176 and 181 which are mounted on supports secured to the switch casing, one of said supports being indicated by the reference numeral 178, Figure 8 and the other of said supports being indicated by the reference numeral 183, Figure 11. The contacts 176 and 181 are electrically connected, by the aforementioned support members, to terminals 175 and 177, Figure 12, which are wired, by wires 187 and 189 respectively, to the governor operated switch 146.

Describing the operation of the switch mechanism 144, when the transmission operating crank 14 is rotated clockwise by the power means to establish the transmission in its second gear setting the switch operating crank 155 is also moved in a clockwise direction; and this operation serves to rotate the cam shaft 154 clockwise, Figure 8, to open the switch 173, 181 mounted alongside the switch 172, 176 said operation of the switch 173, 181 being effected just as the second gear setting of the transmission is being completed. Now it is to be noted from an inspection of Figures 8 and 11 that when the switch mechanism 144 is in its transmission neutral position that both of the aforementioned switches of said mechanism are closed; and for that matter said switches 172, 176 and 173, 181 are both closed except when the transmission is established in either second gear or high gear; for an inspection of the electrical circuits of Figure 2 will reveal that to insure the heretofore described shuttling operation of the motor 78, particularly the vacuum energization of said motor to complete its operation of disengaging the clutch and resetting the transmission, it is necessary to maintain both switches 172, 176 and 173, 181 closed until either the high or the second gear operation of the transmission is completed, in other words, said switches are opened just as the gear shifting operation is being completed. When the crank 14 is rotated counterclockwise to establish the transmission in its third gear setting the switch 172, 176 is opened the companion switch 173, 181 remaining closed; and as with the above described operation of the switch 173, 181 the opening of the switch 172, 176 is effected just as the high gear setting of the transmission is being completed.

Describing the governor operated switch mechanism 146, Figure 10, this mechanism includes a two part casing 180 housing a centrifugally operated governor mechanism 181 which is drivably connected to the propeller shaft of the vehicle or some other moving part of the power plant, the speed of which is directly proportional to the speed of the vehicle. A thrust member 182 of the centrifugal mechanism contacts the central portion of a movable switch contact member 184 which is biased into engagement with a fixed contact 186 by a spring 188. The parts of this switch mechanism are so constructed and arranged and so operative that when the vehicle is at a standstill or is travelling at or below a relatively low speed, for example 10 M. P. H., then the spring 188 serves to move the movable contact member 184 into engagement with the fixed contacts 186; and when the vehicle is travelling at or above say 12 M. P. H. then the centrifugally operated mechanism 181 is operative to force the contact 184 into engagement with a fixed contact member 190. Completing the description of the switch mechanism 146 the other end of the movable contact member 184 is electrically connected to a wire 185 which is connected to the solenoid 148.

Now the parts of the shift rail operated switch 144 are so operative and so cooperate with the governor operated switch 146 that an electrical circuit from the accelerator operated switch 142 to the solenoid 148 is completed when the transmission is established in either second gear or high gear and the governor is operated to close one or the other of the two switches operated thereby; for it is to be remembered that the switches 172, 176 and 173, 181 are both closed except when the transmission is established in either second gear or high gear, the switch 172, 176 being opened when the latter setting of the transmission is completed and the switch 173, 181 being opened when the second gear setting of the transmission is completed. In other words, just as the second gear setting of the transmission is being completed, one of the switches of the mechanism 144 is broken, the other switch being at the time made to thereby prepare for a high gear operation of the mechanism of the invention; then when the speed of the vehicle goes above governor speed, the motor 78 is again energized to effect the high gear setting of the transmission. It is to be remembered, however, that the above discussed electrical circuits are completed to effect an energization of the motor 78 only when the accelerator is released to close the switch 142.

As an additional feature of the invention there is provided mechanism for insuring a closure of the engine throttle 16 as the motor 78 is operating to actuate the transmission and clutch; for if such a mechanism were not provided, then a depression of the accelerator prior to a completion of the operation of the transmission and clutch would result in an undesirable racing of the engine while said operations were being effected. As disclosed in Figure 1, this controlling mechanism includes a stop mechanism 196 interconnecting the piston 82 of the motor 78 and the throttle 16, said mechanism serving both to maintain the throttle closed during the clutch disengaging and transmission operating operation of the motor 78 and to control the degree of opening of the throttle by the accelerator as the spring 134 of said motor is expanding to effect a setting of the alternator 86 and make possible a reengagement of the clutch by its springs.

Describing this stop mechanism 196 the same includes a lever 198 pivotally connected at 196' to a throttle opening link 199, said lever including an arm 200 which is adapted to contact a cam portion 202 of a lever 204 operably connected to the motor operated clutch operating shaft 18. Describing the operation of the stop mechanism when the motor 78 is vacuum energized, the lever 204 is rotated counterclockwise about a shaft 205, a portion A, B of the cam 202 being positioned under the arm 200 to prevent a throttle opening movement of the link 199. The remainder of the throttle opening linkage includes links 51 and 53 connected together by a spring 55; and the link 53 is pivotally connected by a lever 57 and a link 59, to the accelerator 61 of the car. Depression of the accelerator, while the stop mechanism is operating to hold the throttle closed, serves, through the intermediary of a link 63, a crank 65 and the link 59, to open the accelerator operated switch 142. When the motor 78 is de-energized the lever 204 is rotated clockwise a section B, C of the cam 202 serving, by virtue of its contour, to make possible a progressive opening of the throttle by the operation of the accelerator, as the plates of the clutch move into contact with each other. No claim is made in this application to the above described throttle controlling stop mechanism inasmuch as the same is the invention of Earl R. Price and is disclosed in his application No. 697,877, filed September 19, 1946.

Another feature of my invention lies in the provision of electrical means for insuring a completion of the transmission and clutch operating operation of the motor 78 once initiated and despite a depression of the accelerator to open the switch 142 during said operation. This electrical means is disclosed in Figure 2 and includes a breaker switch 49 in a circuit which is in parallel with the accelerator operated switch 142. The switch 49, which is in series with the switch 47 and switch mechanism 144, is preferably mounted in the end wall of the motor 78 and includes a stem 57 contacted by the piston 82 to open the switch when the piston is in its clutch engaged position; and the parts are also so constructed and arranged that during the first increment of clutch disengaging movement of the piston the switch is closed by a spring 63. There is thus provided, by the switch 49, a means for maintaining the motor 78 energized until its operation is completed and despite an opening of the accelerator operated switch 142 during said operation.

The mechanism of my invention also preferable includes means for effecting a stage engagement of the clutch provided the accelerator remains released to maintain the switch 142 closed during the de-energization of the motor 78. Describing this clutch controlling mechanism when the solenoid 148, Figure 16, is de-energized by the opening of one or the other of the switches 172, 176 and 173, 181 as the operation of establishing the transmission in gear is being completed, there is initiated a clutch engaging operation of the motor 78 by the closing operation of the three-way valve 80. In this operation air is transmitted to the motor via a choke valve 65, Figure 14, the three-way valve 80, and a conduit 67. This choke valve includes a tapered member 67' which serves to restrict the flow of air to the valve 80 via a port 69 and a duct 71 when a grounded solenoid 73 is energized to move the member 67' upwardly. A spring 75 serves to bias the valve member 67' downwardly to the position disclosed in Figure 14 when the solenoid 73 is de-energized.

The electrical means for controlling the solenoid 73 is disclosed in Figure 2 and includes a breaker switch 77, Figure 17. This switch includes a casing 79 housing fixed contacts 81 and 83 and a movable contact 85. A stem 87 connected to the movable contact 85 is contacted by a cam member 89 secured to the motor operated rod 84. Describing the operation of the switch 77 the cam 89 serves to close said switch just as the clutch plates are about to contact one another; and the switch is preferably opened by a spring 91 after the clutch plates are in firm contact with each other and immediately prior to the final increment of clutch engaging movement of the piston 82.

There is thus provided, in the clutch control mechanism of my invention, a means for effecting a smooth engagement of the clutch during that part of the cycle of operations of the mechanism when the throttle is closed. If during said cycle of operations the accelerator is depressed to open the switch 142 and thereby disable the clutch mechanism, then the stop mechanism 196 serves to control the opening of the throttle to insure the desired acceleration of the vehicle.

There is also disclosed in Figures 1 and 2 a vacuum motor operated breaker switch 93 operative as a safety means to prevent a down shift that is second gear operation of the motor 78 in the event the governor of Figure 10 should be broken when the vehicle is traveling at a relatively high speed. Describing this mechanism, a vacuum motor 95, connected to a source of vacuum via a conduit 97, serves to open the switch 93 to break the electrical circuit including the fixed contact 186 of the governor 146 at a certain factor of intake manifold gaseous pressure; and this gaseous pressure is effected when the car is traveling at a relatively high speed.

At this juncture it is to be noted that the transmission and clutch operating fluid motor 78 and the switch operating motor 95 have been described as being vacuum operated; however, said motors may, if desired, be energized by any other suitable power medium. The motor 95 and the three way valve 80 of the motor 78 of Figure 1 are preferably connected by the conduit 97 to the intake manifold of the internal combustion engine of the vehicle, said manifold providing a convenient source of vacuum when the engine is idling.

Describing now the complete operation of the mechanism of the invention disclosed in Figure 1, and incidentally completing the description of the parts of said mechanism not heretofore described, it will be assumed that the three-speeds forward and reverse transmission 10 is neutralized and that car is at a standstill with the engine idling, thereby making of the intake manifold of said engine a source of vacuum. The driver will then probably wish to establish the transmission in its low gear setting whereupon he will first manually depress the clutch pedal 26 to disengage the clutch and will then operate the shift lever 43 to manually effect said setting. The accelerator will then be depressed as the clutch is reengaged to get the car under way; and after the desired car speed is reached the shift lever and clutch pedal are again operated to establish the transmission in its second gear setting. The car being then under way in second gear at the desired speed, the driver will probably wish to be relieved of the operation of the transmission and clutch; accordingly, to effect this result he will manually disengage the clutch and then move the shift lever to its so-called automatic position, that is, one of the selective positions of said lever. Describing the latter operation the shift lever 43, which at the time is in its second gear setting is rotated downwardly, that is angularly in a clockwise direction in a plane perpendicular to the plane of the steering wheel; and this operation serves to bodily move the shaft 32 downwardly until a movable contact member 224, Figure 5, of the selector switch 47 is in contact with a fixed contact 226 of said switch to close the same. This operation constitutes a declutching operation of the clutch mechanism 42, the clutch member 52 moving away from the clutch member 44 the movement of the latter being prevented by the stop 68.

Figure 5:
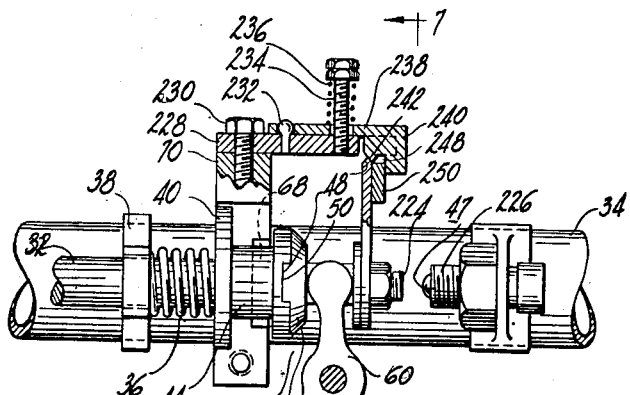
Figure 5 is an enlarged view of the mechanism at the base of the steering column said mechanism serving to disconnect the shift lever from the power operated transmission operating linkage.
Figure 6:
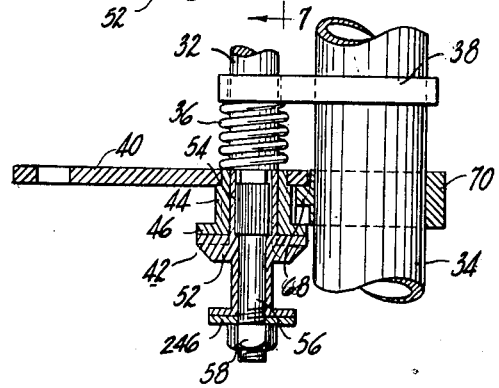
Figure 6 is a sectional view, taken on the line 6—6 of Figure 7, disclosing certain features of the mechanism disclosed in Figure 5.
Figure 7:
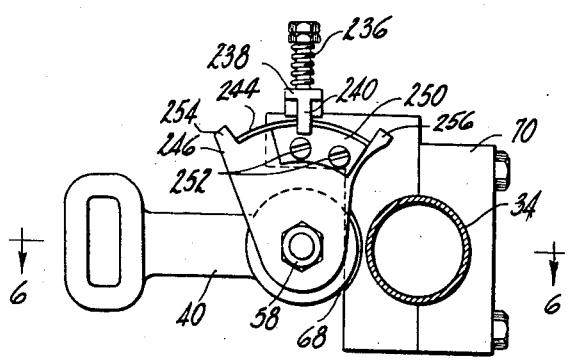
Figure 7 is a front view, taken on the line 7—7 of Figure 5, of the mechanism disclosed in Figure 5.

Referring to Figures 5 and 7 there is disclosed a latch mechanism for holding the shift lever in its automatic position, said mechanism including a relatively narrow rectangular shaped support member 228 preferably detachably secured to the bracket member 70 by a bolt 230; and there is mounted on said support member, by means of a guide pin 232, a bolt 234 and a spring 236, a movable latch member 238 shaped at its outer end to provide a relatively narrow stop member 240. Now when the shift lever 43 is moved to its automatic position a relatively narrow wedge-shaped flange portion 242 of the member 238 is rocked and/or bodily lifted, against the tension of the spring 236, by the camming action of a wedge-shaped peripheral edge portion 244 of a stop member 246 which is secured to the pin 56, Figure 6, between the lower flange portion of the clutch member 52 and the nut 58; and this operation serves to position said peripheral edge portion 244 in the space indicated by the reference numeral 248 Figure 5. Incidently the shift rail selecting mechanism of the transmission and the cooperating transmission parts are so constructed that the crank 62 may be moved beyond its second and high shift rail selective position in effecting the above described automatic setting of the shift lever.

Now at this juncture it is to be noted, from an inspection of Figure 7, that a rectangular shaped stop member 250, secured to the outer face of the stop member 246 by screws 252, is in contact with the member 240 when the parts are in their transmission neutral position and when the spring 36 has operated to move the crank 12 to its second and high shift rail position, that is, the position preparing in the transmission for either second or high gear operation. It follows therefore that the stop member 246 must be rotated clockwise in Figure 7 so that the member 250 will clear the member 240 before the shift lever may be moved downwardly to its automatic position, that is, the position to close the switch 47; and it becomes apparent from the above description that the parts of the mechanism are so constructed and arranged that this automatic setting of the shift lever may only be effected after said shift lever has been moved to establish the transmission in its second gear setting. Referring to Figure 7 of the drawings in this position of the parts, that is, the second gear setting, a stop 254 on the member 246 will contact the side of the members 228 and 238 and the stop member 250 will be positioned to the right of the member 240. Completing the description of the member 246 a stop 256 is provided thereon to contact one side of the members 228 and 238 when the shift lever is moved to either its low or high gear position.

Continuing the description of the operation of the mechanism the driver having moved the shift lever to its automatic position and assuming that the car is travelling above governor speed to close the switch 184, 190, Figure 10, the transmission will then be automatically established in its high gear setting after the driver releases the accelerator to close the switch 142; for with this operation an electrical circuit is completed via the grounded battery 138, the ignition switch 140, the then closed selector switch 47, the then closed accelerator operated switch 142, the switch 172, 176 of the rail switch 144, the switch 184, 190 of the governor operated switch 146 and the grounded solenoid 148. The resulting operation of the three way valve 80 effects an energization of the motor 78 the piston 82 of the latter being then subjected to a differential of pressures to move the same to the right, Figure 1. The left side of the piston 82 is at all times subjected to the pressure of the atmosphere via an opening 258 in one end of the motor and the right side of said piston, that is the side constituting a wall of a compartment 260, is subjected to a relatively low gaseous pressure when the three way valve 80 is opened to interconnect said compartment with the intake manifold or other source of vacuum. When the latter valve is closed, that is, when the solenoid 148 is deenergized, the compartment 260 is vented to the atmosphere through said valve and the spring 134 within said compartment is then operative to move the piston 82 to the left, Figure 1, to permit a reengagement of the friction clutch and an operation of the alternator 86.

Describing the clutch disengaging and transmission operating operation of the motor 78 the above referred to rightward movement of the piston 82 serves to rotate the crank 24 to disengage the clutch; and as this operation is being effected the spring 94 is expanded inasmuch as the rod 88 cannot be moved to operate the transmission until after the clutch is disengaged. Now after the clutch plates are moved out of contact with each other the above described yieldable force transmitting means interconnecting the rod 88 and crank 14 becomes operative to move said crank and establish the transmission in its high gear setting; and as this operation of the transmission is being completed the rail switch 144 becomes operative to brake the switch 172, 176 and make the companion switch 173, 181 adjacent thereto. Now the breaking of the switch 172, 176 results in a deenergization of the solenoid 148 and as described above this results in a deenergization of the motor 78 to permit a stage reengagement of the clutch if the accelerator is not depressed to open the switch 142; and a controlled opening of the throttle if the accelerator is depressed during said deenergization of the motor. At this juncture it is to be remembered that when the alternator 86 is operated in the operation of establishing the transmission in its high gear setting said alternator is at the same time operated to preselect a subsequent operation of the transmission to establish the same in its second gear setting; and it is to be noted that Figure 3 discloses the parts of the alternator in their high gear setting as described above during this power operation of the mechanism in establishing the transmission in its high gear setting the throttle 16 is held closed by the motor operated stop mechanism 196 thereby preventing a racing of the engine.

The transmission will now remain in its high gear setting until the car is slowed down below governor speed and the accelerator is released whereupon the motor 78 will again be energized to establish the transmission in its second gear setting and to operate the clutch and throttle to facilitate said operation. If the car is then brought to a stop without neutralizing the transmission, that is leaving the shift lever in its automatic setting, the operation of the fluid coupling of the power plant will obviate a stalling of the engine despite the relatively high gear ratio setting of the transmission and despite the fact that the idling engine is at the time directly connected to the then stationary propeller shaft of the vehicle.

Figure 18:
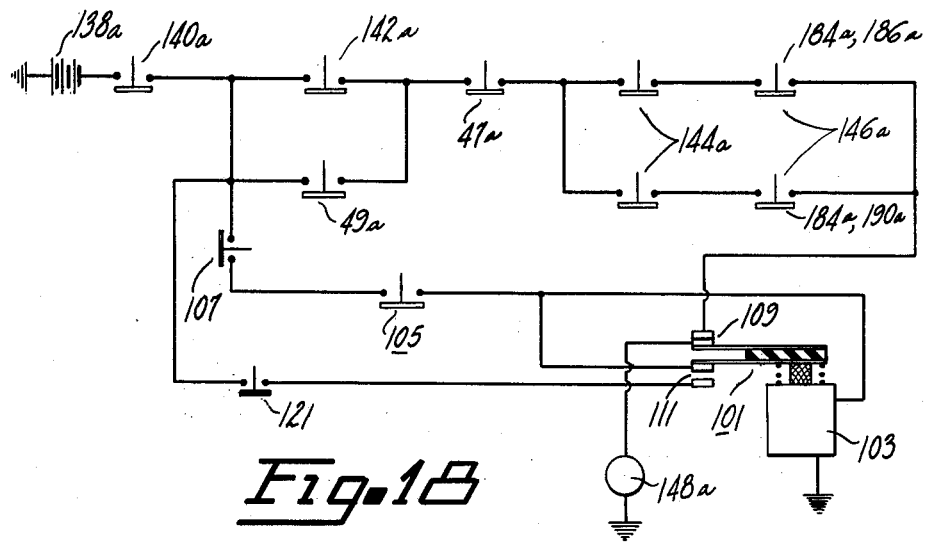
Figure 18 is a view, similar to Figure 2, disclosing the electrical control means of one embodiment of the transmission operating mechanism of my invention.

There is disclosed in Figure 18 electrical control means for the motor 78 constituting an improvement over the electrical control means disclosed in Figure 2; for with the controls of Figure 18, which may supplant the electrical controls of the mechanism of Figure 1, there is insured a second gear operation of the mechanism despite a closing of the switch 184a, 186a during the operation of the mechanism in establishing the transmission in its high gear setting and despite an opening of the switch 142 during the latter operation. As suggested above, this operation of the switch 184a, 186a is effected if the driver suddenly applies the car brakes to slow the vehicle down below governor speed when the mechanism is in the process of establishing the transmission in its high gear setting. The electrical hookup of Figure 18 may also if desired, differ from that disclosed in Figure 2 in the omission of the switch 93 and the omission of the controls for effecting a stage engagement of the clutch. Those parts of the controls of the mechanism of Figure 18 which duplicate the controls of Figures 1 and 2 are given the same reference numeral with the addition of the letter A.

Figure 13:
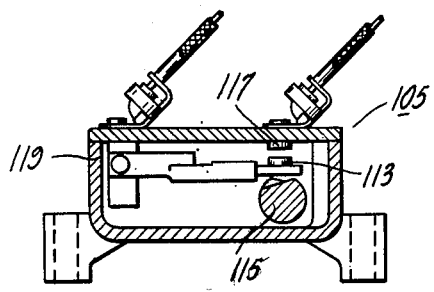
Figure 13 is a sectional view disclosing details of the transmission operated relay controlling switch of the embodiment of my invention disclosed in Figure 18.

The feature of the electrical hookup of Figure 18 constituting the principal part of the improvement over the hookup of Figure 2 lies in the incorporation of a hold-down relay mechanism 101 included in the electrical connection between the solenoid 148a and the governor operated switch 146a. This hold-down relay mechanism preferably includes a grounded relay coil 103 which is electrically connected in series with a transmission operated switch 105, Figure 13, a motor operated breaker switch 107, the ignition switch 140a and the grounded battery 138a. As is made clear from an inspection of Figure 18, the relay coil 103 when energized serves to open a normally closed switch 109 and to close a normally open switch 111 of the relay switch mechanism. The switch 105, which is similar in general to the switch mechanism 144 of Figure 8 is disclosed in Figure 13 and includes a two part casing 119 housing a movable contact 113 biased by a spring, not shown, into engagement with a shaft 115; and said shaft is so shaped and so connected to the crank 14 that the contact 113 is moved into contact with a fixed contact 117 to close the switch, when the transmission is established in either second gear or high gear. When the transmission is being operated to shift the setting from second gear to high gear or high gear to second gear then the switch is opened.

The motor operated breaker switch 107, which is of standard construction and which may duplicate the switch disclosed in Figure 17, is preferably mounted in one end of the vacuum motor 78 and is closed by the power element 82 of the motor when said element reaches the end of its power stroke; and the spring acting upon the movable contact of the switch biases said contact to the switch open position when the power element is moved by the return spring within the motor.

The normally open switch 111 of the relay mechanism 101, which is closed when the relay coil 103 is energized, is preferably wired in series with said relay coil, a motor operated breaker switch 121, the ignition switch 140a and the grounded battery 138a; and the switch 121, which is a duplicate of the switch 49 of Figures 1 and 2, is also of standard breaker switch construction and is opened by the power element 134 of the motor 78 when said power element reaches its released, that is, clutch engaged position. The switch 121 is closed during the first increment of clutch disengaging movement of the power element and remains closed when the motor is energized.

As described above, just as the high gear operation of the motor 78 is being completed, the switches 105 and 107 are closed thereby effecting an energization of the relay coil 103 which in turn results in an opening of the switch 109 to insure a de-energization of said motor. It is to be remembered that the switch 121 is closed when the high gear operation of the transmission is being completed and the closure of said switch serves to maintain the coil 103 energized thereby maintaining the switch 109 open during the de-energization of the vacuum motor 78 and despite the opening of the switch 107 as the latter operation is initiated. There is thus provided, in the hold-down relay mechanism 101 together with the controls for said mechanism, means for effecting what may be termed a recycle operation of the mechanism if the switch 184a, 186a is closed as the shift mechanism is operating to establish the transmission in its high gear setting; for immediately after the latter operation of the transmission is completed, the mechanism will be automatically operated to establish the governor called for second gear setting of the transmission.

There is disclosed in Figure 19 another improvement over the electrical control means disclosed in Figure 2 in that there is disclosed in this figure means, operative at the will of the driver, for effecting a power operated shift of the transmission from its high gear setting to its second gear setting when the vehicle is traveling above governor speed. Those parts of the controls of Figure 19 which duplicate the controls of Figure 2 are indicated by the same reference numerals with the addition of the letter b.

The principal feature of the improvement disclosed in Figure 19 lies in a hold-down relay mechanism 123 comprising a grounded relay coil 125 and normally open switches 127 and 129. The relay coil 125 and switch 127 are controlled respectively by selector switches 133 and 135 which are operably connected to the previously described shift lever operated selector switch 47b; and it is to be noted from an inspection of Figure 19 that the switches 47b and 133 are closed at the same time, that is, when the driver elects the automatic operation of the transmission. The switches 47b and 133 are opened when the switch 135 is closed, that is, when the driver elects to effect the overrule operation of the mechanism to establish the transmission in its second gear setting. The switch 135 is closed when the shift lever 43 is in its second gear position, that is, when the flange portion 242 and the edge portion 244 are in the relative positions disclosed in Figure 5. A cut out switch 137 may also be included in the controls of Figure 19 so that the driver may disable the power means in the event he desires to effect a manual operation of the transmission. The three switches 47b, 135 and 133, constituting a single manually operated switch mechanism, are indicated as a whole by the reference numeral 191. The normally open switch 129 which constitutes the hold-down switch of the hold-down relay mechanism 123, is preferably wired in series with a normally closed switch 139 of a series wound relay 141 and a normally closed transmission operated or oft called rail switch 143 operated by the crank 14, said switch 143 being broken when the transmission is established in its second gear setting. The switch 143 is disclosed in detail in Figure 16 and includes a casing 145 housing fixed switch contact members 147 and 149 and a movable contact member 151 secured to a piston 153. A flange member, not shown, mounted on the link 76 contacts the end of a stem 159 to open the switch 143 just as the second speed gears of the transmission are completing their meshing operation; and the control of the air entering the switch casing via an opening 161 in a check valve 163, serves to delay the operation of a spring 165 in returning the switch member 151 to its switch closed position. The series wound relay 141 is also of standard construction and includes a relay coil 171 which is connected in series with the solenoid 148b, and the governor operation switch mechanism 146b. The relay 141 also includes the aforementioned normally closed switch 139.

Describing now the operation of the controls of Figure 19, said controls, for all normal operation of the vehicle, operate just as do the corresponding controls of Figure 2. However, it is often desirable, for example when traveling above governor speed in high gear and upon reaching the base of a mountain highway, to quickly shift the transmission to its second gear setting. With the controls of Figure 19 this may be effected inasmuch as the closing of the switch 133 effects an energization of the relay coil 125 thereby closing the switches 127 and 129; and the switch 127 is held closed by the hold-down operation of the switch 129 when the high gear setting of the transmission is established the latter operation resulting in a closing of the switch 139. Then when the driver closes the switch 135 to effect the second gear overrule operation of the mechanism, the electrical circuit including the switch 127 and the solenoid 148b is completed whereby there is effected an operation of the motor 78 to successively disengage the clutch and establish the transmission in its second gear setting. The driver will then complete the operation by depressing the accelerator to open the switch 142 to effect a clutch engaging operation of the motor and open the throttle to speed up the engine.

There is disclosed in Figure 20 a combination of the control means of Figures 18 and 19 the parts of said combination corresponding to like parts in the controls of the latter figures being given the same reference numeral with the addition of the letter c with the controls disclosed in Figures 18 and 19 the controls of Figure 20 may be employed to control the operation of the motor 78 of Figure 1. Briefly discussing the operation of the mechanism of Figure 1 equipped with the controls of Figure 20, release of the accelerator to close the switch 142c and operation of the shift lever to close the switch 47c prepares the mechanism for operation under the control of the transmission operated switch mechanism 144c, and the governor operated switch mechanism 146c, all as previously described. The hold down relay mechanism 111c insures a recycle operation of the mechanism to establish the transmission in second gear in the event the speed of the car is brought below governor speed as the mechanism is in the process of establishing a high gear setting of the transmission; and the hold down relay mechanism 123c, with the co-operation of the manually operated selector switch mechanism 191c, makes it possible for the driver of the vehicle to effect a second gear setting of the transmission when the vehicle is travelling above governor speed.

There is thus provided, by the mechanism of Figure 1 controlled by the electrical controls of Figure 20, a simple and effective manually and power operated mechanism for operating the transmission, clutch and throttle of an automotive vehicle; and the clutch pedal, the shift lever and the accelerator constitute the only manually operated controls of said mechanism. The driver may, after opening the switch, manually operate the clutch and the three speeds forward and reverse transmission in a conventional manner, that is, by operating the clutch pedal and by effecting the so-called H movement of the shift lever; and if he desires an automatic operation of the transmission to alternately establish the same in its second and high gear settings he has only to move the shift lever from its second gear setting to its automatic setting. Thereafter for all normal straight ahead driving of the vehicle the driver need only operate the acceleraor. However, if the car becomes mired he probably will, after a manual disengagement of the clutch, operate the shift lever to establish the transmission in its low gear setting; and to reverse the direction of movement of the car the driver must, of course, first manually disengage the clutch and then operate the shift lever to establish the transmission in its reverse gear setting.

If a manually operated second gear setting of the transmission is desired when the transmission is established in its high gear setting and the shift lever is positioned in its automatic setting, then the driver will, after opening the switch and manually disengaging the clutch, first move the shift lever out of its automatic setting whereupon he will successively rotate the shift lever to its high gear position to mesh the clutch members 44 and 52 and then rotate said lever to its second gear position.

With the accelerator released and the transmission established in high gear above governor speed, a power operated second gear setting of the transmission may be effected simply by returning the shift lever to its second gear position. With the mechanism of my invention disclosed in Figure 20 the clutch disengaging and transmission operating operation of the motor 78 is completed once initiated and despite a depression of the accelerator during said operation; furthermore with the accelerator released the mechanism will automatically effect a second gear setting of the transmission after a high gear setting has been completed, the latter setting having been effected during a deceleration of the vehicle below governor speed.

I claim:

1. In an automotive vehicle provided with a three speeds forward and reverse transmission and a gear shift lever; manually and power operated means for operating the transmission, said means including force transmitting means comprising a clutch mechanism interconnecting the gear shift lever and transmission and which may be operated to establish the transmission in any one of its settings, a transmission operating pressure differential operated motor operably connected to a portion of said force transmitting means and operative to effect certain settings of the transmission, means for controlling the operation of said motor including a switch which is closed when the shift lever is actuated to operate the clutch to disconnect the shift lever from the transmission and further including another switch which is closed when the shift lever is moved to its second gear position.

2. In an automotive vehicle provided with a three speeds forward and reverse transmission and a gear shift lever; manually and power operated means for operating the transmission, said means including force transmitting means comprising a clutch mechanism interconnecting the gear shift lever and transmission and which may be operated to establish the transmission in any one of its settings, a transmission operating pressure differential operated motor operably connected to a portion of said force transmitting means and operative to alternately effect first one and then the other of two settings of the transmission, means for controlling the operation of said motor including a switch which is closed when the shift lever is actuated to operate the clutch to disconnect the shift lever from the transmission, and further including another switch which is closed when the shift lever is moved to its second gear position, the motor being then operative to establish the transmission in its second gear setting.

3. Manually and power operated means for operating a change speed transmission comprising a manually operated lever, force transmitting means, including a clutch, interconnecting the lever and transmission and being operated to establish the transmission in any one of its settings; power means for operating the transmission to alternately effect first one and then the other of two settings of the transmission, valve means for controlling the operation of the power means, and means for controlling the operation of the valve means including a switch which is closed when the lever is moved to a certain position, said closure making possible an operation of the power means to effect the aforementioned two settings of the transmission, and another switch which is closed when the lever is moved to a certain position, said closure making possible an operation of the power means to effect the aforementioned two settings of the transmission, and another switch which is closed when the lever is moved to another position, the closing of the latter switch making possible an operation of the power means to effect one of the aforementioned two settings of the transmission.

4. Manually and power operated means for operating a change speed transmission and for operating a friction clutch to facilitate said operation of the transmission, said means comprising a manually operated lever, force transmitting means, including a clutch, interconnecting the lever and transmission and being operated to establish the transmission in any one of its settings; power means for operating the transmission to alternately effect first one and then the other of two settings of the transmission, the friction clutch being disengaged before each of said operations and then re-engaged after said operation is completed, valve means for controlling the operation of the power means, and means for controlling the operation of the valve means including a switch which is closed when the lever is moved to a certain position, said closure making possible an operation of the power means to effect the aforementioned two settings of the transmission, and another switch which is closed when the lever is moved to another position, the closing of the latter switch making possible an operation of the power means to effect one of the aforementioned two settings of the transmission.

5. In an automotive vehicle provided with a three speeds forward and reverse transmission and a gear shift lever selectively movable to a position to effect an automatic operation of the transmission and to any one of a plurality of positions in the operation in effecting a manual operation of the transmission, manually and power operated means for operating the transmission including force transmitting means interconnecting the shift lever and transmission and operative, when the end of the shift lever is moved to outline the letter H, to manually establish the transmission in any one of its settings; together with power means operative as a result of a selective movement of the shift lever either to its automatic position or to its second gear position, to effect a power operation of the transmission.

6. In an automotive vehicle provided with a three speeds forward and reverse transmission, a friction clutch, and a gear shift lever selectively movable to a position to effect an automatic operation of the transmission and to any one of a plurality of positions in the operation of effecting a manual operation of the transmission, manually and power operated means for operating the transmission including force transmitting means interconnecting the shift lever and transmission and operative, when the end of the shift lever is moved to outline the letter H, to manually establish the transmission in any one of its settings; together with power means, including a single acting pressure differential motor operative as a result of a selective movement of the shift lever either to its automatic position and or to its second gear position, to effect a power operation of the transmission, the clutch being disengaged immediately prior to the power operation of the transmission and re-engaged immediately after the operation of the transmission is completed.

7. Manually and power operated means adapted to effect a sequential operation of the clutch and three speeds forward and reverse transmission of an automotive vehicle including a transmission operating crank, a clutch operating member, a manually operated lever, force transmitting means interconnecting said crank and lever, a part of said force transmitting means being manually actuated to operate the clutch and transmission and a part of said force transmitting means being power operated to also operate the clutch and transmission, a pressure differential operated motor for actuating the latter part of the force transmitting means to alternately effect a second gear setting of the transmission and high gear setting thereof depending on the speed of the vehicle, valve means for controlling the operation of said motor, and electrical means, including a governor operated switch for controlling the operation of said valve means comprising an automatically operated hold-down relay mechanism operative to insure the setting of the transmission called for by the governor.

8. In an automotive vehicle provided with a three speeds forward and reverse transmission, a friction clutch, an accelerator, an engine throttle and a gear shift lever; manually and power operated means for operating the transmission and for operating the clutch and throttle to facilitate the operation of the transmission, said means including a pressure differential operated motor, force transmitting means interconnecting the shift lever, the transmission, the clutch and the motor, the latter when operated serving to actuate a part of the force transmitting means to operate the transmission and clutch and control the operation of the throttle, the clutch being engaged by a stage operation; valve means for controlling the operation of the motor, and electrical means for controlling the operation of the valve means, including, in series, an accelerator operated switch, a gear shift lever operated switch, a transmission operated switch mechanism, a governor operated switch mechanism, and a valve operating solenoid, and further including a hold-down relay mechanism operative to insure the operation of the mechanism called for by the governor operated switch mechanism.

9. In an automotive vehicle provided with a change speed transmission, a gear shift lever, a speed responsive governor and an accelerator; means for operating the transmission including power means operative to effect first one and then the other of two settings of the transmission, the operation effected depending upon the speed of the vehicle; said power means including a single acting fluid pressure motor, valve means for controlling the operation of said motor, and electrical means for controlling the operation of said valve means including, in series, an accelerator operated switch, a shift lever operated switch, a breaker switch mechanism including two separate switches both operated by the motor, a single pole double throw switch mechanism actuated by the governor, a relay operated normally closed switch, and a valve operating solenoid; said electrical means further including, in series with the battery, a relay coil for operating the relay switch, a normally open breaker switch mechanism operated by the aforementioned motor, said switch being closed when the transmission is established in either one of the aforementioned two settings, and a normally open breaker switch which is closed when the power element of the motor reaches the end of its transmission operating stroke; together with a normally open breaker switch connected in series with the relay coil, the battery, and a normally closed breaker switch which is opened when the power element of the motor reaches its motor de-energized, that is, released position.

10. In an automotive vehicle provided with a change speed transmission, a friction clutch, a gear shift lever, a vehicle speed responsive governor, and an accelerator; means for operating the transmission including power means operative to effect first one and then the other of two settings of the transmission, the operation effected depending upon the speed of the vehicle; said power means including a fluid pressure motor, valve means for controlling the operation of said motor, and electrical means for controlling the operation of said valve means including, in series, a battery, an accelerator operated switch, a shift lever operated switch, a breaker switch mechanism including two separate switches both operated by the motor, a single pole double throw switch mechanism actuated by the governor, a relay coil and a valve operating solenoid; said electrical means further including, in series with the accelerator operated switch and valve operating solenoid, a normally open relay operated switch and a shift lever operated selector switch, and further including, in series with the accelerator switch, a relay coil for operating the relay operated switch and another shift lever operated selector switch; together with a normally open switch operated by the latter relay coil and electrically connected thereto, said latter switch being electrically connected in series with a normally closed breaker switch which is opened when the transmission is established in second gear, a normally closed switch which is operated by the first mentioned relay coil, and the battery.

11. Manually and power operated means for operating the three speeds forward and reverse transmission of an automatic vehicle and for operating the clutch and throttle of the vehicle to facilitate the operation of the transmission, said means including a vehicle speed responsive governor, a single acting pressure differential operated motor, valve means for controlling the operation of said motor, force transmitting means, including a direction changing mechanism, interconnecting the gear shift lever of the vehicle, the clutch, the motor and the transmission; and electrical means for controlling the operation of the valve means to effect a cycle of operations of the motor once said operation is initiated, said electrical control means including, in series, a battery, a single pole double throw switch operated by the governor, a valve operating solenoid, a gear shift lever operated switch, and a dual switch breaker switch mechanism operated by the motor, one of said switches being opened when the operation of establishing the transmission in second gear is complete and the other of said switches being opened when the operation of establishing the transmission in high gear is completed; together with a hold-down relay switch mechanism operative to successively break and then remake the aforementioned electrical connection to thereby insure an operation of the motor to effect the setting of the transmission called for by the governor.

12. In a control system for a motor vehicle variable speed ratio transmission, a lever pivotally mounted on an axis, means operatively connected to said lever and adapted for manual control by the vehicle driver, an operative connection of said lever with said transmission, a second rotatably mounted lever, a resilient connection between said levers, a movable element, means to actuate said element under selected vehicle operating conditions, an operative connection between said element and said second lever whereby said resilient connection permits delayed transmission of motion from said element to said transmission and whereby manual control of the vehicle driver is transmitted directly through said first lever to said transmission.

13. In a control system for a motor vehicle variable speed ratio transmission, a bellcrank pivotally mounted on an axis, means operatively connected to said bellcrank and adapted for manual control by the vehicle driver, an operative connection of said bellcrank with said transmission, a rotatably mounted lever, a lost motion connection between said bellcrank and said lever, a movable element, means to actuate said element under selected vehicle operating conditions, an operative connection between said element and said lever whereby said lost motion connection cushions the transmission of motion from said element to said transmission through said bellcrank and whereby manual control of the vehicle driver is transmitted directly through said bellcrank to said transmission.

14. In a control system for a motor vehicle variable speed ratio transmission, a lever pivotally mounted on an axis, an operative connection of said lever to said transmission, a power shift mechanism, a second lever rotatably mounted on said axis and operatively connected to said mechanism, said levers being in close contact with each other adjacent said axis, a resilient connection between said levers whereby a minimum of thickness along said axis is obtained and whereby motion imparted to said second lever by said mechanism is transmitted to said first lever through said resilient connection.

15. In a control system for a motor vehicle variable speed transmission, a first movably mounted member, means operatively connected to said member and adapted for manual control by the vehicle driver, an operative connection of said first member with said transmission, a second movably mounted member, a resilient connection between said members, a movable element, means to actuate said element under selected vehicle operating conditions, an operative connection between said element and said second member whereby said resilient connection permits delayed transmission of motion from said element to said transmission and whereby manual control of the vehicle driver is transmitted through said first member to said transmission.

RICHARD H. LONG.

REFERENCES CITED

The following references are of record in the file of this patent:

UNITED STATES PATENTS

| Number | Name | Date |
|---|---|---|
| 2,160,331 | Hill | May 30, 1939 |
| 2,277,914 | Kesling | Mar. 31, 1942 |
| 2,287,272 | Price et al. | June 23, 1942 |
| 2,296,290 | Mayrath | Sept. 22, 1942 |
| 2,328,392 | Neracher et al. | Aug. 31, 1943 |
| 2,328,921 | Neff | Sept. 7, 1943 |
| 2,373,259 | Price | Apr. 10, 1945 |
| 2,374,303 | Osborne | Apr. 24, 1945 |
| 2,426,234 | Neracher et al. | Aug. 26, 1947 |
| 2,434,717 | Randol | Jan. 20, 1948 |
| 2,528,772 | Neracher | Nov. 7, 1950 |
| 2,532,945 | Robinson | Dec. 5, 1950 |
| 2,536,462 | Price | Jan. 2, 1951 |
| 2,593,605 | Price | Apr. 22, 1952 |